United States Patent [19]
Hong

[11] Patent Number: 5,483,288
[45] Date of Patent: Jan. 9, 1996

[54] INTERPOLATING COMPONENT GENERATOR FOR SCANNING LINE INTERPOLATOR USING INTRA-FIELD AND INTER-FIELD PSEUDO MEDIAN FILTERS

[75] Inventor: Sung H. Hong, Seoul, Rep. of Korea

[73] Assignee: Goldstar Co., Ltd., Seoul, Rep. of Korea

[21] Appl. No.: 138,600

[22] Filed: Oct. 18, 1993

[30] Foreign Application Priority Data

Oct. 28, 1992 [KR] Rep. of Korea ............... 19942/1992

[51] Int. Cl.⁶ ............................ H04N 7/01; H04N 11/20
[52] U.S. Cl. ........................................ 348/448; 348/451
[58] Field of Search ......................... 348/448–452, 348/446; H04N 7/01, 11/20

[56] References Cited

U.S. PATENT DOCUMENTS

| | | | |
|---|---|---|---|
| 4,989,090 | 1/1991 | Campbell et al. | 348/451 |
| 5,051,826 | 9/1991 | Ishii et al. | 348/448 |
| 5,070,394 | 12/1991 | Kobayashi | 348/451 |
| 5,315,699 | 5/1994 | Imai et al. | 395/162 |

*Primary Examiner*—James J. Groody
*Assistant Examiner*—Cheryl Cohen
*Attorney, Agent, or Firm*—Fliesler, Dubb, Meyer & Lovejoy

[57] ABSTRACT

An interpolating component generator for a scanning line interpolator using pseudo median filters wherein in generating an interpolating component signal required for converting an image signal of the interlaced scanning system into an image signal of the progressive scanning system, a determination is made whether an inter-field variation is larger than an intra-field variation, based on a determination signal from an inter-field/intra-field determination processor so that an intra-field pseudo median filter is used when the inter-field variation is larger than the intra-field variation, whereas an inter-field pseudo median filter is used when the intra-field variation is larger than the inter-field variation, so as to calculate a pixel value to be finally used in interpolation, thereby solving problems such as a step edge phenomenon and a reduced vertical resolution encountered in fixed intra-field or inter-field interpolation systems, an overlap phenomenon occurring in median filters, arid an increase in cost and a failure to consider diagonal components in Faroudja's temporal median filter system.

6 Claims, 15 Drawing Sheets

FIG.3A
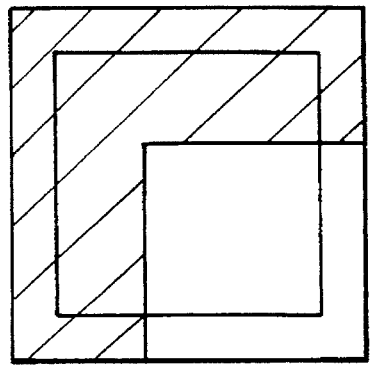
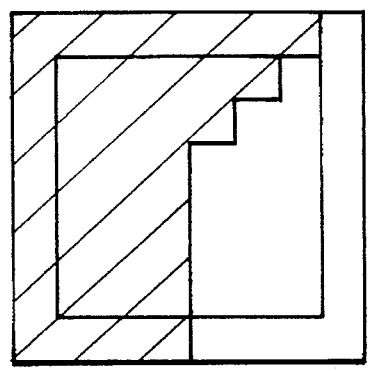
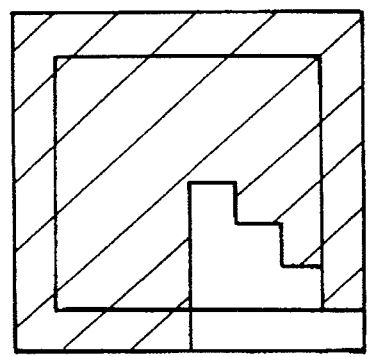
☐ : 100 IRE
▨ : 0 IRE

FIG. 3B
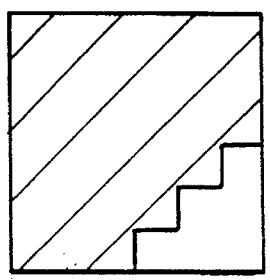
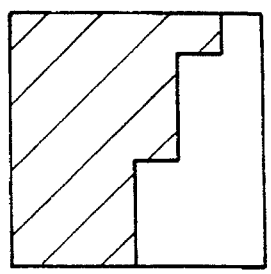
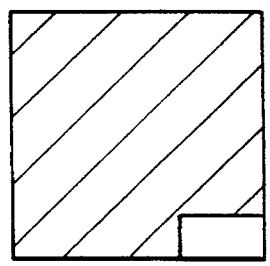
☐ : 100 IRE
▨ : 0 IRE

FIG. 3C
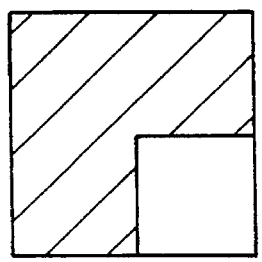
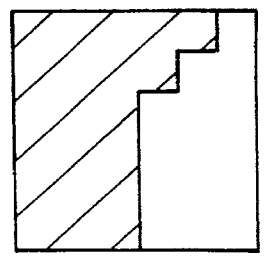
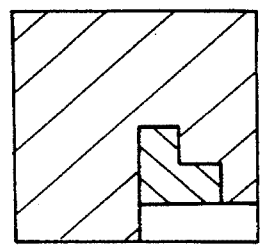
☐ : 100 IRE
▨ : 0 IRE
◪ : 50 IRE

| a | b | c | d | e |
|---|---|---|---|---|

| a | b | c |
|---|---|---|
| d | e | f |
| g | h | i |

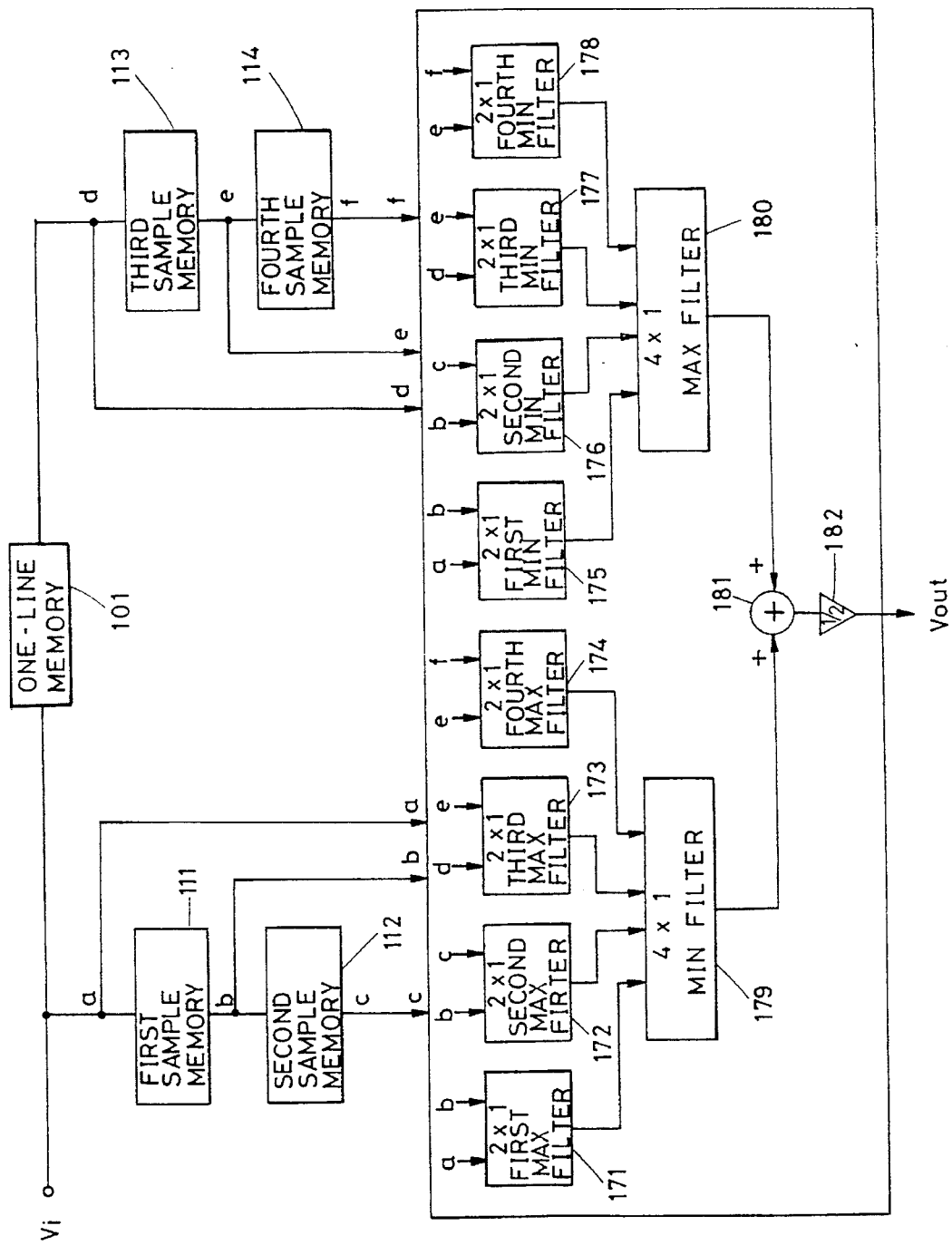

5,483,288

INTERPOLATING COMPONENT GENERATOR FOR SCANNING LINE INTERPOLATOR USING INTRA-FIELD AND INTER-FIELD PSEUDO MEDIAN FILTERS

BACKGROUND OF THE INVENTION

1. Field of the Invention

The present invention relates to an interpolating component generator for a scanning line interpolator, and more particularly to an interpolating component generator for a scanning line interpolator utilizing pseudo median filters.

2. Description of the Prior Art

Conventionally, there have been used various scanning line interpolation systems for solving picture quality-deteriorating factors such as line flickers appearing in TV signals of interlaced scan systems, line structure, low vertical resolution. Such scanning line interpolation systems are classified into a line repeat system wherein a previous scanning line component is substituted for a scanning line $i_n$ to be interpolated, as shown in FIG. 1A, an inter-field interpolation system utilizing a line average to use an average between upper and lower scanning line components in the same field as the scanning line $i_n$ to be interpolated, as shown in FIG. 1B, and another inter-field interpolation system wherein a previous scanning line component is substituted for the scanning line $i_n$ to be interpolated, as shown in FIG. 1C.

There have been also used a motion application system wherein motion value of an image is determined so that an intra-field interpolation system is employed for a non-motive region whereas an inter-field interpolation system is employed for a motive region, and a median filter system wherein pixel values around a position to be interpolated are applied to a median filter to calculate a pixel value to be used in interpolation. In particular, U.S. Pat. Nos. 4,967,217 and 4,989,090 issued to Faroudja disclose a scanning line interpolation system wherein two field memories and two line memories are utilized to calculate a pixel value to be used in interpolation. In accordance with this scanning line interpolation system, an output from a temporal median filter is added to a component derived in a field, based on a motion value derived by a motion detector so as to output a final interpolation value. When position of a pixel to be interpolated is i, as shown in FIG. 1D, and a motion coefficient indicative of a motion value is K (0<K<1), the interpolation value can be calculated by the following equation:

$$K * (\text{intra-field component}) + (1-K) * \text{median} (c, (a+b)/2, d)$$

wherein, (a+b)/2 is used as the intra-field component.

However, the conventional line repeat system exhibits a considerable deterioration in picture quality such as a step edge phenomenon, even though it is inexpensive. In the scanning interpolation utilizing the line averaging system, a deterioration in picture quality that an image involving a vertical variation becomes dim is generated. On the other hand, the inter-field interpolation system exhibits a good picture quality for non-motive images. In this case, however, a considerable deterioration in picture quality occurs in images involving motions, even though a good picture quality is exhibited for non-motive images.

The median filter system is difficult to be compatible with images involving white noises, due to the characteristic of median filter. Furthermore, the median filter system performs only nonlinear operations, resulting in an increased possibility of an overlap phenomenon. On the other hand, the Faroudja's scanning interpolation system is expensive because of the use of frame memories. Furthermore, this system is difficult to be compatible with images involving diagonal variation because it does not take into consideration diagonal components of images.

SUMMARY OF THE INVENTION

Therefore, an object of the invention is to provide an interpolating component generator for a scanning line interpolator using pseudo median filters wherein in generating an interpolating component signal required for converting an image signal of the interlaced scanning system into an image signal of the progressive scanning system, a determination is made whether an inter-field variation is larger than an intra-field variation, based on a determination signal from an inter-field/intra-field determination processor so that an intra-field pseudo median filter is used when the inter-field variation is larger than the intra-field variation, whereas an inter-field pseudo median filter is used when the intra-field variation is larger than the inter-field variation, so as to calculate a pixel value to be finally used in interpolation, thereby solving problems such as a step edge phenomenon and a reduced vertical resolution encountered in fixed intra-field or inter-field interpolation systems, and an overlap phenomenon occurring in median filters.

In accordance with the present invention, this object can be accomplished by providing an interpolating component generator for a scanning line interpolator using pseudo median filters comprising: an inter-field/intra-field determination unit for determining an intra-field variation and an inter-field variation from an input image signal; an inter-field pseudo median filter unit for generating a pixel value to be used in interpolation by use of current field information and previous field information of said input image signal; an intra-field pseudo median filter unit for generating a pixel value to be used in interpolation only by use of current field information of the input image signal; a mixing unit for mixing output signals from said inter-field and intra-field pseudo median filter units according to output information from said inter-field/intra-field determination unit and thereby outputting a pixel value to be finally used in interpolation; and a median value generating unit for receiving the input image signal and calculating a median value, based on the received input image signal, said median value being used in generation of said pixel value to be used in interpolation.

In this interpolating component generator, the inter-field/intra-field determination unit receives an input image signal to determine an intra-field variation and an inter-field variation from the received input image signal. The inter-field/intra-field determination unit generates a determination control signal based on the determination result and sends it to the mixing unit.

The inter-field pseudo median filter unit applies information of scanning lines in the current field and a scanning line to its pseudo median filters so as to calculate a pixel value to be used in interpolation.

The intra-field pseudo median filter unit generates median values by use of scanning lines in the current field and pixels in the current field and applies them to its filters so as to calculate a pixel value to be used in interpolation.

When the mixing unit receives the pixel values obtained from the inter-field or intra-field pseudo median filter unit, it selects one of the received pixel values according to output information from said inter-field/intra-field determination unit and thereby outputs a pixel value to be finally used in interpolation.

By the pixel value, this interpolating component generator can solves problems such as a shimmering phenomenon, a step edge phenomenon, a reduced vertical resolution, noise, line structure, and a line flicker phenomenon.

BRIEF DESCRIPTION OF THE DRAWINGS

Other objects and aspects of the invention will become apparent from the following description of embodiments with reference to the accompanying drawings in which:

FIGS. 3A to 3C are performance comparison diagrams for determining compatibilities of two-dimensional median filter and pseudo median filter with two-dimensional images;

FIGS. 12 and 13 are block diagrams of different embodiments of an intra-field pseudo median filter constituting a part of the interpolating component generator of FIG. 6, respectively.

DETAILED DESCRIPTION OF THE PREFERRED EMBODIMENTS

Figure 6:
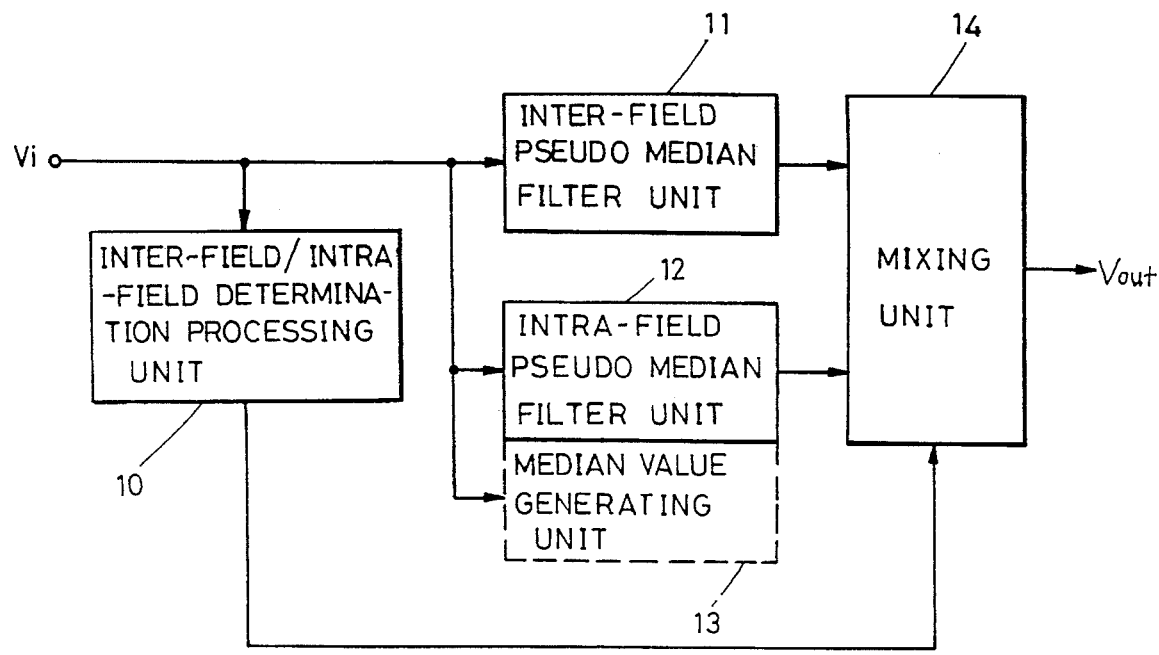
FIG. 6 is a block diagram illustrating an interpolating component generator for a scanning line interpolator using pseudo median filters in accordance with the present invention.

FIG. 6 is a block diagram illustrating an interpolating component generator for a scanning line interpolator using pseudo median filters in accordance with the present invention. As shown in FIG. 6, the interpolating component generator comprises an inter-field/intra-field determination unit 10 for determining an intra-field variation and an inter-field variation from an input image signal Vi, an inter-field pseudo median filter unit 11 for generating a pixel value to be used in interpolation by use of current field information and previous field information of the input image signal Vi, and an intra-field pseudo median filter unit 12 for generating a pixel value to be used in interpolation only by use of current field information of the input image signal Vi. The interpolating component generator further comprises a mixing unit 14 for mixing output signals from the inter-field and intra-field pseudo median filter units 11 and 12 according to output information from the inter-field/intra-field determination unit 10 and thereby outputting a pixel value to be finally used in interpolation, and a median value generating unit 13 for receiving the input image signal Vi and calculating a median value, based on the received input image signal Vi.

Figure 9A:
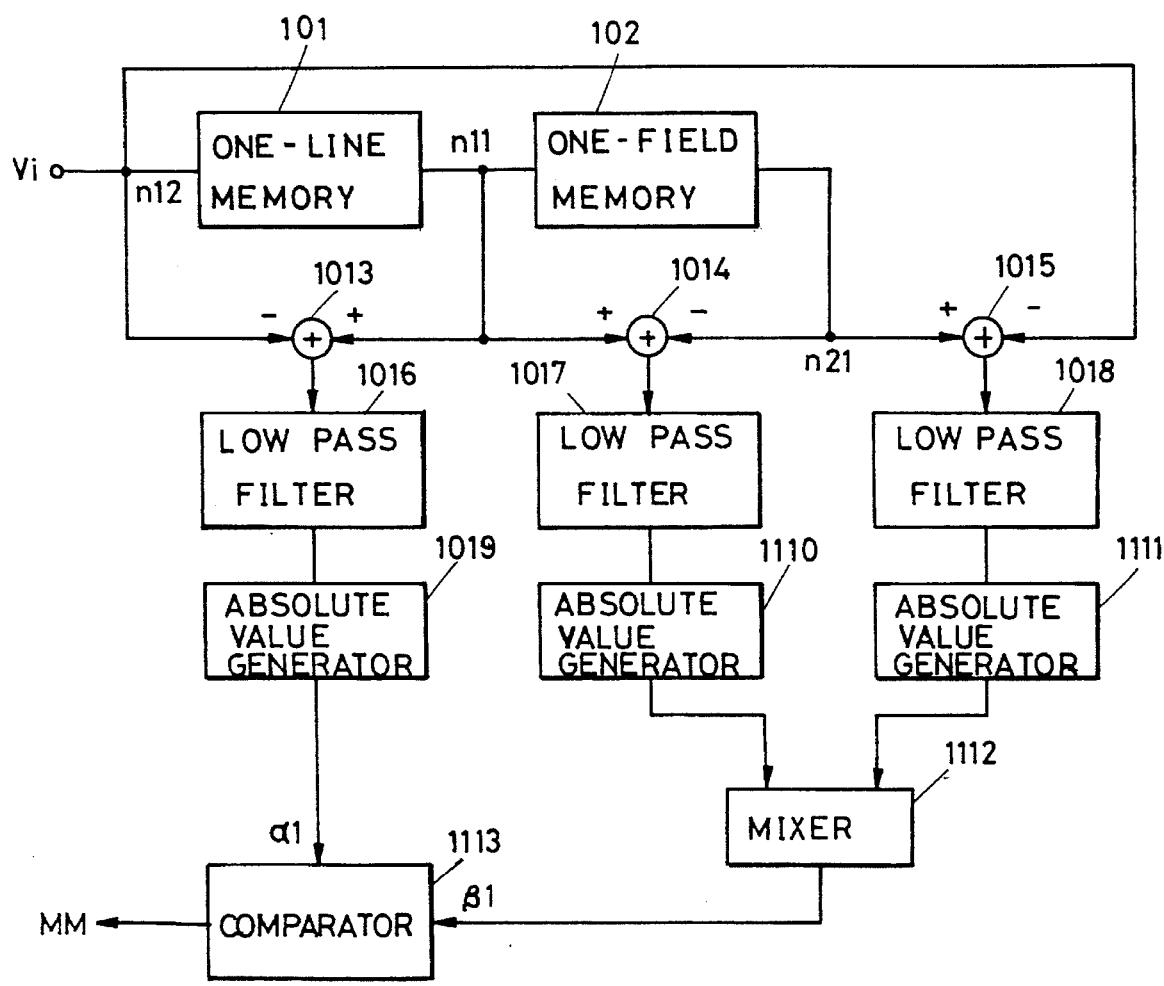
FIG. 9A is a block diagram of an inter-field/intra-field determination processing unit constituting a part of the interpolating component generator of FIG. 6.

As shown in FIG. 9A, the inter-field/intra-field determination unit 10 includes an one-line memory 101 for delaying the input image signal Vi by one line, an one-field memory 102 for delaying an output signal from the one-line memory 101 by one field, a first adder 1013 for adding the output signal from the one-line memory 101 to the input image signal Vi, a second adder 1014 for adding an output signal from the one-field memory 102 to the output signal from the one-line memory 101, and a third adder 1015 for adding the output signal from the one-field memory 102 to the input image signal Vi. The inter-field/intra-field determination unit 10 further includes low pass filters 1016, 1017 and 1018 for low-pass filtering output signals from the first to third adders 1013, 1014 and 1015, respectively, absolute value generators 1019, 1110 and 1111 for receiving output signals from the low pass filters 1016, 1017 and 1018 and thereby generating absolute values, respectively, a mixer 1112 for mixing output signals from the absolute value generators 1110 and 1111, and a comparator 1113 for comparing an output signal $\alpha_1$ from the absolute value generator 1019 with an output signal $\beta_1$ from the mixer 1112 and thereby outputting the comparison result as a determination control signal MM.

Figure 10:
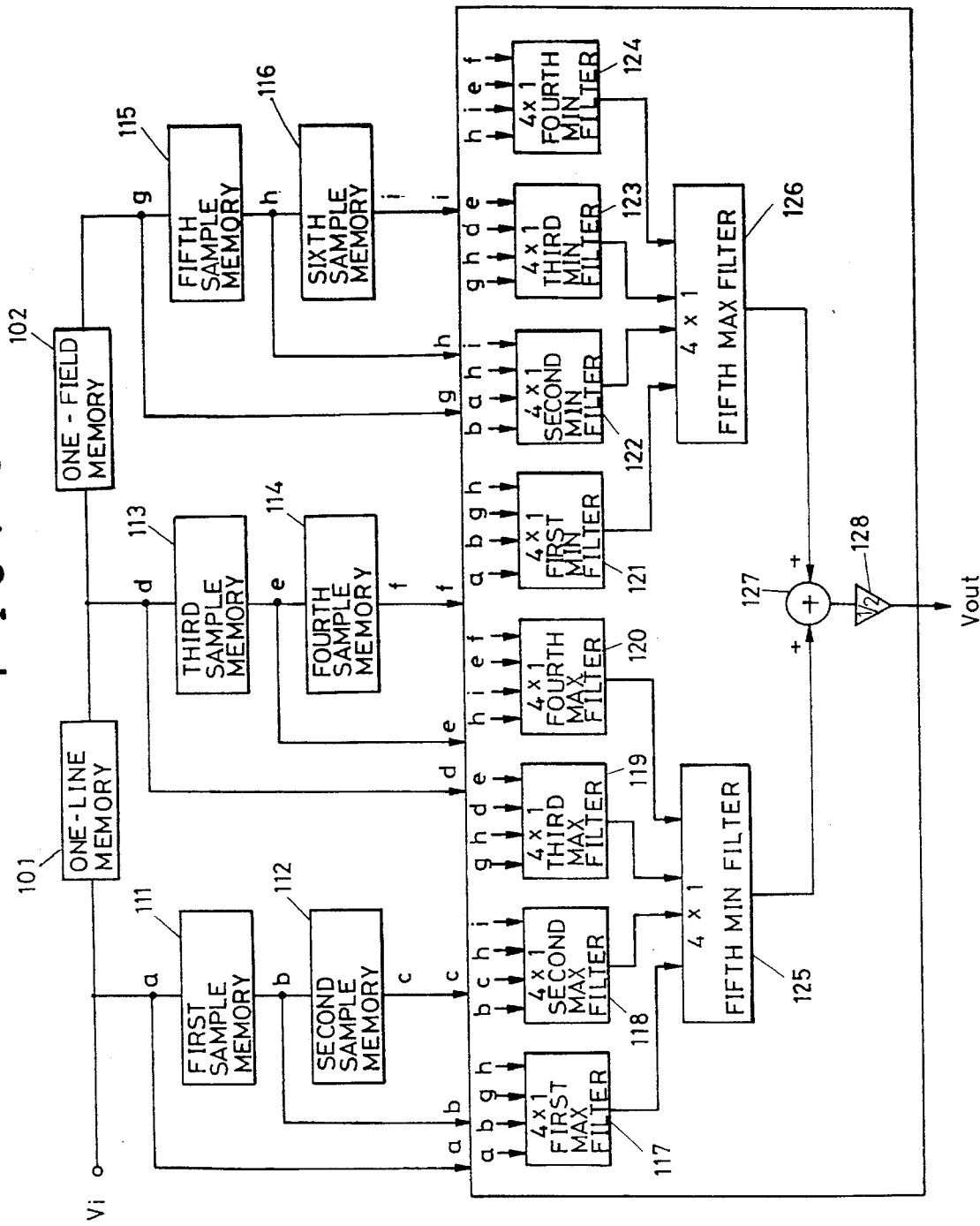
FIGS. 10 and 11 are block diagrams of different embodiments of an inter-field pseudo median filter constituting a part of the interpolating component generator of FIG. 6, respectively.

As shown in FIG. 10, the inter-field pseudo median filter unit 11 includes first and second sample memories 111 and 112 for sequentially delaying the input image signal Vi by one clock and thereby generating pixel values a, b and c, and third and fourth sample memories 113 and 114 for sequentially delaying the output signal from the one-line memory 101 and thereby generating pixel values d, e and f. The one-line memory 101 which serves to delay the input image signal Vi by one line also constitutes a part of the inter-field pseudo median filter unit 11. The inter-field pseudo median filter unit 11 further includes fifth and sixth sample memories 115 and 116 for sequentially delaying the output signal from the one-field memory 102 by one clock and thereby generating pixel values h and i. The one-field memory 102 which serves to delay the output signal from the one-line memory 101 by one field also constitutes a part of the inter-field pseudo median filter unit 11. The inter-field pseudo median filter unit 11 further includes first to fourth 4×1 Max filters 117 to 120 for detecting Maximum ones from four-pixel values (a,b,g,h), (b,c,h,i), (g,h,d,e), (h,i,e,f) received therein and outputting them, respectively, first to fourth 4×1 Min filters 121 to 124 for detecting minimum ones from the four-pixel values and outputting them, respectively, a fifth 4×1 Min filter 125 for detecting the minimum one from output signals of the first to fourth 4×1 Max filters 117 to 120, a fifth 4×1 Max filter 125 for detecting the Maximum one from output signals of the first to fourth 4×1 Min filters 121 to 124, an adder 127 for adding an output signal from the fifth 4×1 Min filter 125 to an output signal from the fifth 4×1 Max filter 128, and a ½ amplifier 128 for ½ amplifying an output signal from the adder 127.

Figure 12:
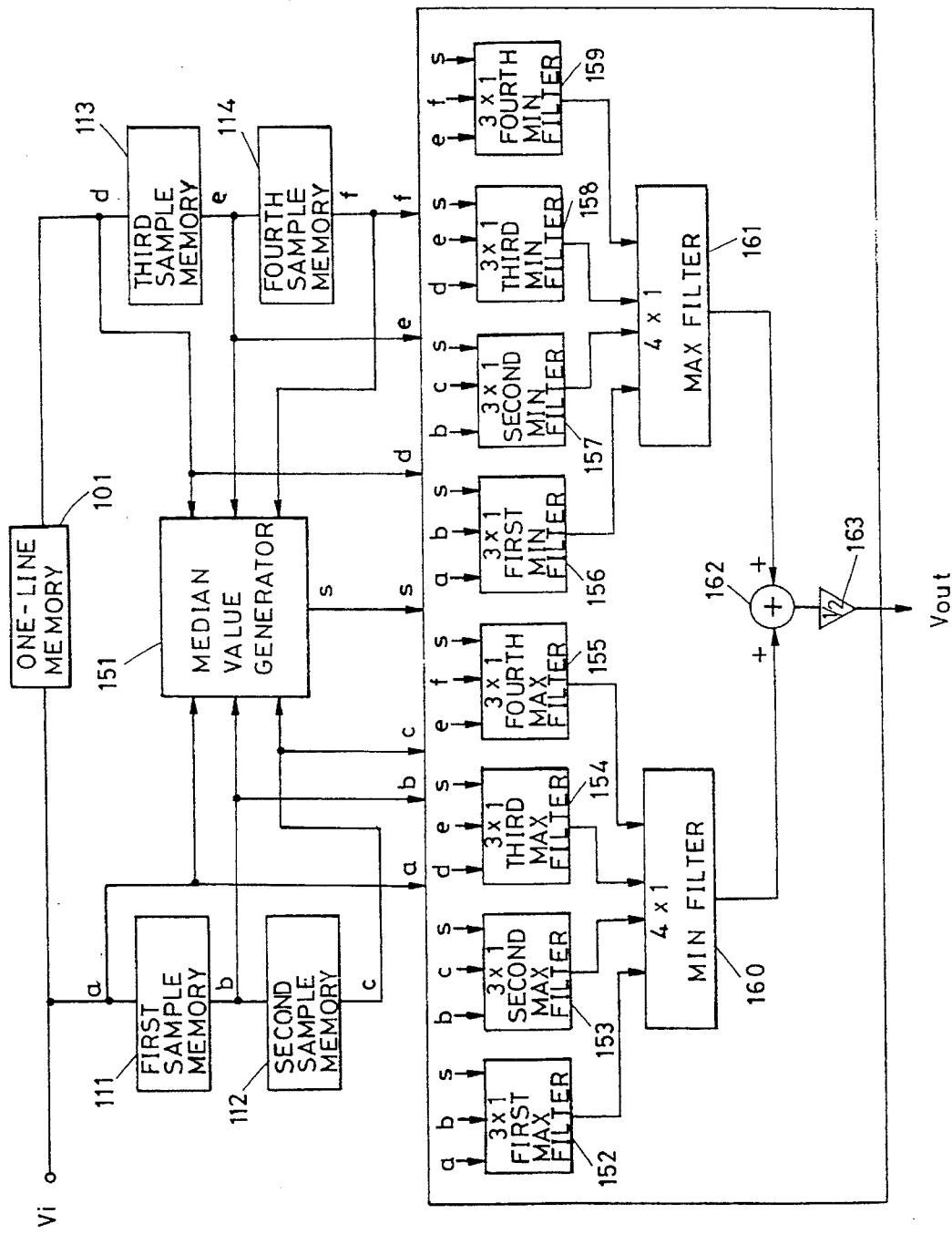

As shown in FIG. 12, the intra-field pseudo median filter unit 12 includes the first and second sample memories 111 and 112 for sequentially delaying the input image signal Vi by one clock and thereby generating pixel values a, b and c, the one-line memory 101 for delaying the input image signal Vi by one line, and the third and fourth sample memories 113 and 114 for sequentially delaying the output signal from the one-line memory 101 and thereby generating pixel values d, e and f. The intra-field pseudo median filter unit 12 further includes a median value generator 151 for receiving the pixel values a to f generated from the one-line memory 101 and the first to fourth sample memories 111 to 114 and thereby calculating a median value s, first to fourth 3×1 Max filters 152 to 155 for detecting Maximum ones from three-pixel values (a,b,s), (b,c,s), (d,e,s), (e,f,s) each including two pixel values and the median value and outputting them, respectively, first to fourth 3×1 Min filters 156 to 159 for detecting minimum ones from the three-pixel values and outputting them, respectively, a 4×1 Min filter 160 for detecting the minimum one from output signals of the first to fourth 3×1 Max filters 152 to 155, a 4×1 Max filter 161 for detecting the Maximum one from output signals of the first to fourth 3×1 Min filters 156 to 159, an adder 162 for adding an output signal from the 4×1 Min filter 160 to an output signal from the 4×1 Max filter 161, and a ½ amplifier 163 for ½ amplifying an output signal from the adder 162.

Figure 14A:
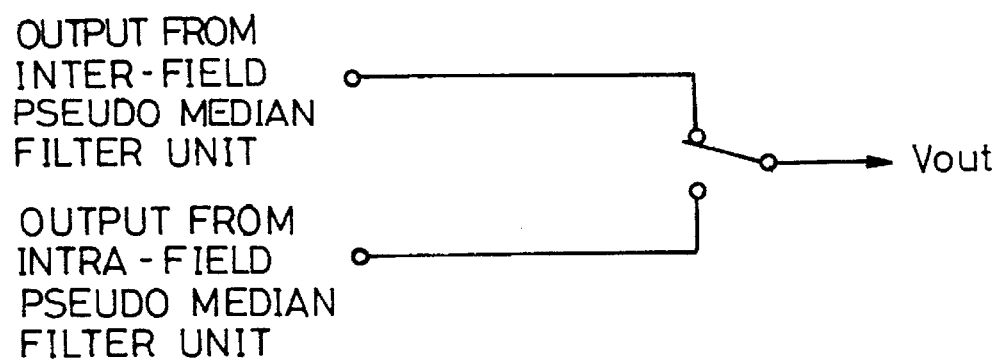
FIGS. 14A and 14B are circuit diagrams of different embodiments of a mixing unit constituting a part of the interpolating component generator of FIG. 6, respectively.
Figure 14B:
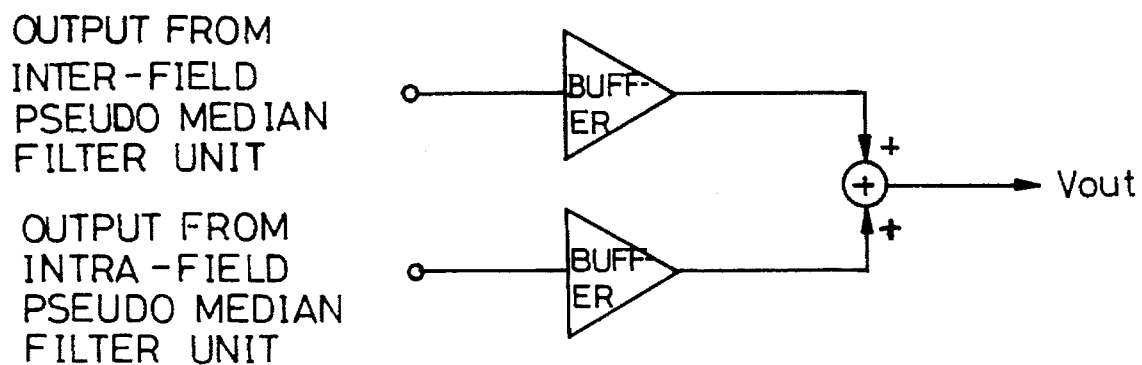

As shown in FIGS. 6 and 14A, the mixing unit 14 may be constituted to select, as a pixel to be used in interpolation, one of output signals from the intra-field and inter-field pseudo median filter units 11 and 12, according to the determination control signal MM outputted from the inter-field/intra-field determination processing unit 10. Otherwise, the mixing unit 14 may be constituted to select, as a pixel to be used in interpolation, a value obtained by summing output signals from the intra-field and inter-field pseudo median filter units 11 and 12, according to the determination control signal MM outputted from the inter-field/intra-field determination processing unit 10, as shown in FIGS. 6 and 14B.

Figure 1A:
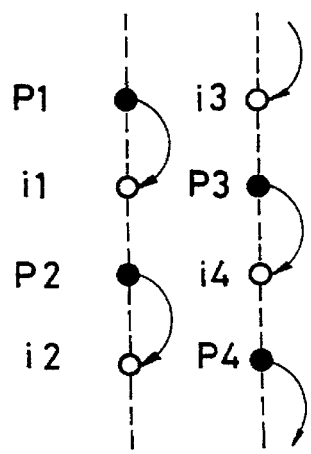
FIG. 1A is a schematic diagram for explaining a pixel value calculation in a conventional scanning line interpolation system utilizing a line repeat.
Figure 1B:
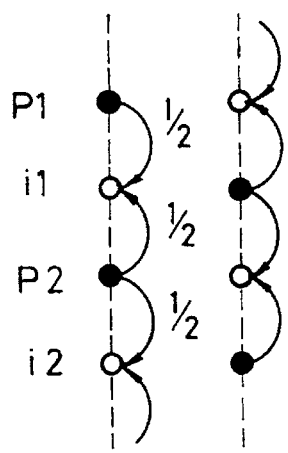
FIG. 1B is a schematic diagram for explaining a pixel value calculation in a conventional inter-field interpolation system utilizing a line average.
Figure 1C:
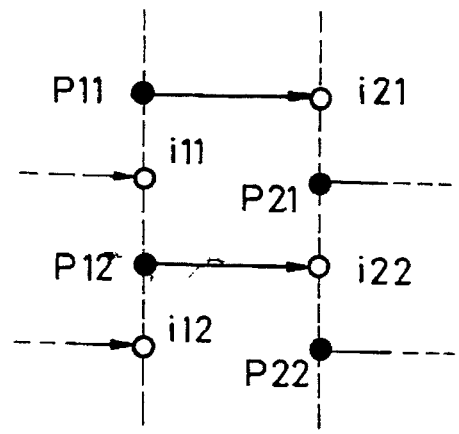
FIG. 1C is a schematic diagram for explaining a pixel value calculation in a conventional inter-field interpolation system utilizing an inter-field insertion.
Figure 1D:
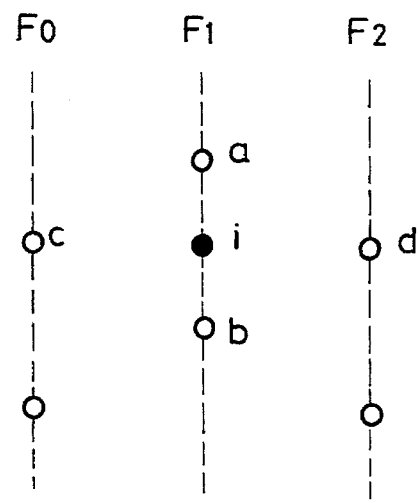
FIG. 1D is a schematic diagram for explaining a pixel value calculation in a conventional Faroudja's inter-field interpolation system.
Figure 2A:
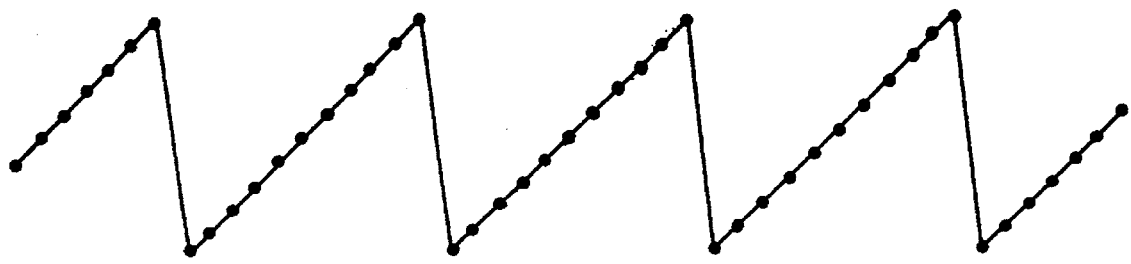
FIGS. 2A to 2D are waveform diagrams of saw waves processed by 5-tab median filter, average filter and pseudo median filter, respectively.
Figure 2B:
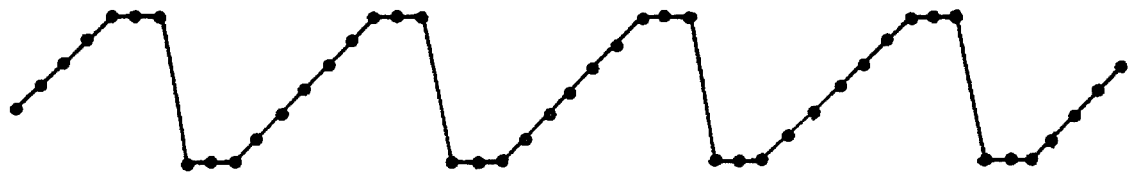
Figure 2C:
Figure 2D:
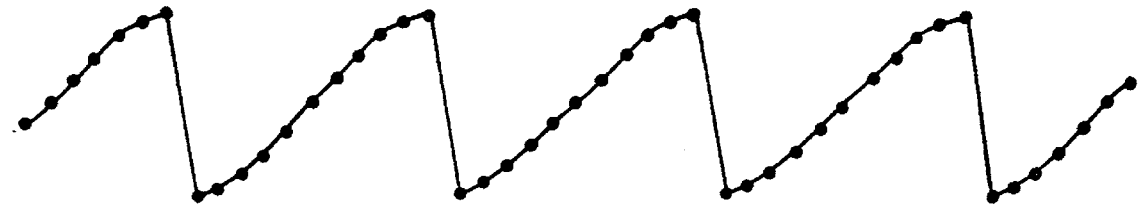

Operation of the interpolating component generator in accordance with the present invention will now be described.

Where saw waves having the length of 5 tabs are applied to a median filter, an average filter and a pseudo median filter, respectively, for understanding the characteristic of pseudo median filter, output signals having waveforms shown in FIGS. 2B to 2D are generated from the filters, respectively. By referring to the waveforms of FIGS. 2B to 2D, it can be found that the result obtained by the pseudo median filter exhibits a reduced error over the results obtained by the median filter and average filter. It can be also found that the step position is maintained in case of the pseudo median filter.

FIGS. 3A to 3C are performance comparison diagrams for determining compatibilities of two-dimensional median filter and pseudo median filter with two-dimensional images. By referring to FIGS. 3A to 3C, it can be found that the pseudo median filter shown in FIG. 3B is well compatible with 90°, 135° and 45° edges of an original image shown in FIG. 3A, over the median filter shown in FIG. 3C.

Figures 4A, 4B, 5:
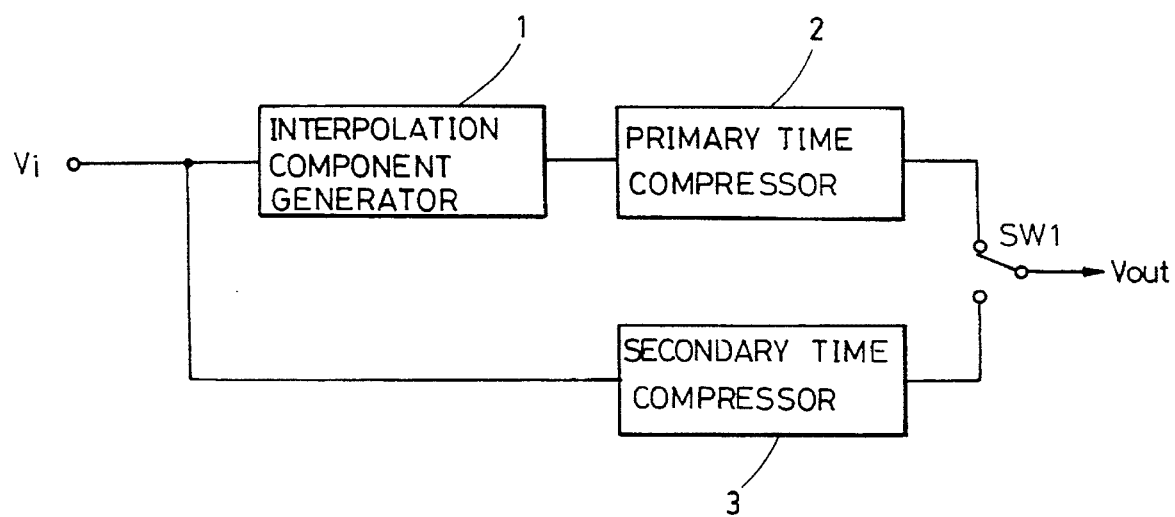
FIGS. 4A and 4B are diagrams illustrating signal patterns in scanning line interpolation.
FIG. 5 is a block diagram of a general scanning line interpolator.

As shown in FIG. 4A, calculation in a one-directional pseudo median filter (PMED) having the length of 5 tabs is carried out as follows:

$$PMED = 0.5 \times Min\{Max(a,b,c), Max(b,c,d), Max(c,d,e)\} + 0.5 \times Max\{Min(a,b,c), Min(b,c,d), Min(c,d,e)\}.$$

As shown in FIG. 4B, calculation in a 3×3 square pseudo median filter is carried out as follows:

$$\begin{aligned}PMED = \ &0.5 \times Max\{Min(a,b,d,e), Min(b,c,e,f), \\ &Min(d,e,g,h), Min(e,f,g,i)\} + \\ &0.5 \times Min\{Max(a,b,d,e), Max(b,c,e,f), \\ &Max(d,e,g,h), Max(e,f,g,i)\}.\end{aligned}$$

In operation of the inter-field/intra-field determination processing unit 10, the first adder 1013 receives at its inverting terminal (−) a signal $n_{12}$ indicative of an input image signal and at its non-inverting terminal (+) a one-line delayed signal $n_{11}$ generated by the one-line memory 101 so that it generates a differential signal A ($A = n_{11} - n_{12}$). The second adder 1014 receives at its non-inverting terminal (+) the signal $n_{11}$ from the one-line memory 101 and at its inverting terminal (−) a signal $n_{21}$ generated by a one-field memory 102, thereby generating a differential signal B ($B = n_{11} - n_{21}$). On the other hand, the third adder 1015 receives at its non-inverting terminal (+) the signal $n_{21}$ from the one-field memory 102 and at its inverting terminal (−) a signal $n_{12}$ indicative of the input image signal, thereby generating a differential signal C ($C = n_{21} - n_{12}$).

Figure 9B:
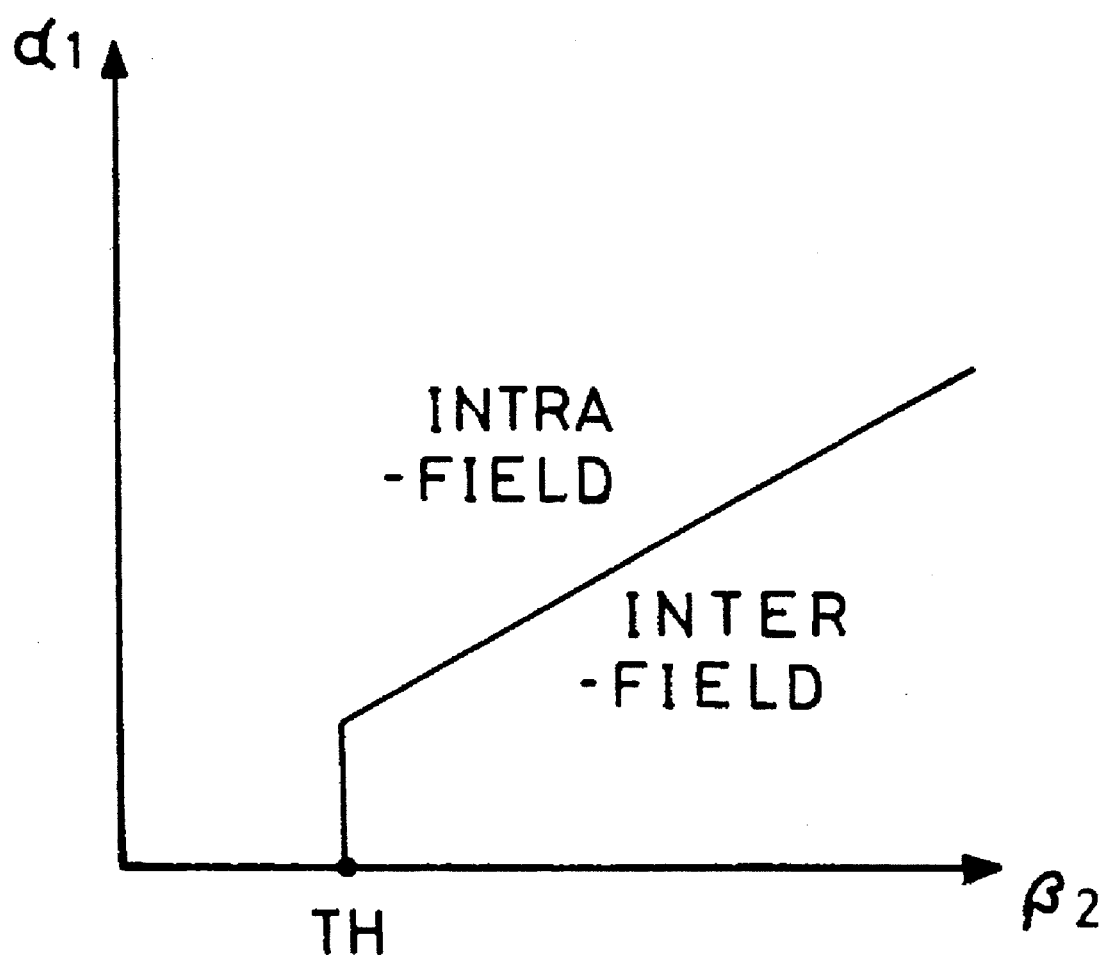
FIG. 9B is a block diagram of a comparator constituting a part of the inter-field/intra-field determination processing unit of FIG. 9A.

The generated differential signals A, B and C pass through the low pass filters 1016 to 1018, respectively, to be low-pass filtered, and then enter the absolute value generators 1019, 1110 and 1111 which, in turn, generate absolute values, respectively. The absolute values from the absolute value generators 1110 and 1111 are applied to the mixer 1112 which, in turn, sums the applied absolute values or performs a Max-filtering of the absolute values, thereby generating an operated signal value $\beta_1$. The mixed signal value $\beta_1$ from the mixer 1112 is applied to the comparator 1113 which also receives the absolute value $\alpha_1$ outputted from the absolute value generator 1015. The comparator 1113 compares the received values $\alpha_1$ and $\beta_1$ with reference to a threshold voltage TH shown in FIG. 9B so as to select one from outputs of the inter-field pseudo median filter unit and intra-field pseudo median filter unit. Where an inter-field variation is larger than an intra-field variation, the output of the intra-field pseudo median filter unit is used. On the other hand, the output of the inter-field pseudo median filter unit is used when the intra-field variation is larger than the inter-field variation. This determination is made according to a determination curve shown in FIG. 9B.

The output $\alpha_1$ of the absolute value generator 1019 is indicative of a vertically varied amount of successive signals in the same field whereas the output $\beta_1$ is indicative of a varied amount of signals in successive fields.

Figure 7:
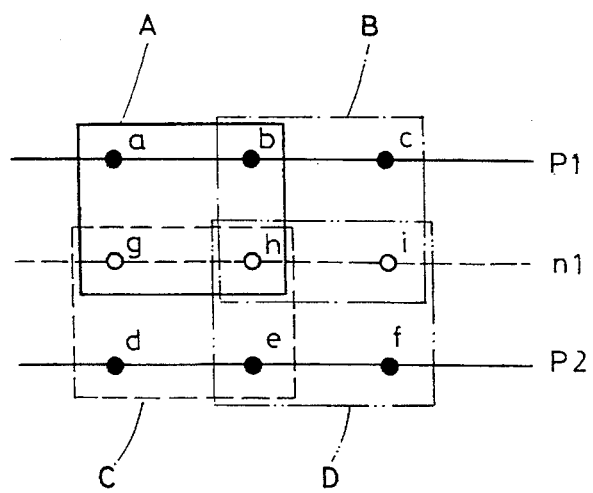
FIG. 7 is a diagram illustrating an interpolation value generation pattern achieved in an inter-field pseudo median filter used in the interpolating component generator of FIG. 6.
Figure 8:
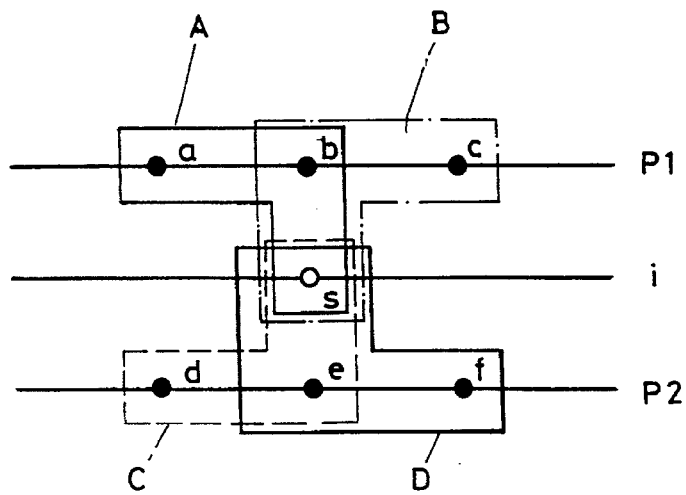
FIG. 8 is a diagram illustrating an interpolation value generation pattern achieved in an intra-field pseudo median filter used in the interpolating component generator of FIG. 6.

Thus generation of an interpolation signal required to convert an image signal from the interlaced scanning mode into the progressive scanning mode is achieved by applying the input image signal Vi to the inter-field/intra-field determination processing unit 10, comparing a vertically varied amount of successive signals in the same field with a varied amount of signals in successive fields, and feeding, to the mixing unit 14, a determination control signal MM for selecting one from outputs of the inter-field pseudo median filter unit 11 and intra-field pseudo median filter unit 12, The inter-field pseudo median filter unit 11 applies information of scanning lines $P_1$ and $P_2$ in the current field and a scanning line $n_1$ (this scanning line is a scanning line delayed by 262 lines with reference to the scanning line $P_2$ in case of a NTSC signal) to the pseudo median filters so as to calculate a pixel value to be used in interpolation, as shown in FIG. 7.

Assuming that a position of a pixel to be interpolated corresponds to a position between b and c in the current field, the inter-field pseudo median filter unit 11 operates by use of the following processing equation:

$$PMED[A,B,C,D] = 0.5 \times \text{Min}\{\text{Max}(a,b,g,h), \quad (1)$$
$$\text{Max}(b,c,h,i), \text{Max}(g,h,d,e),$$
$$\text{Max}(h,i,e,f)\} + 0.5 \times$$
$$\text{Max}\{\text{Min}(a,b,g,h), \text{Min}(b,c,h,i),$$
$$\text{Min}(g,h,d,e), \text{Min}(h,i,e,f)\}.$$

In the equation (1), the use ratio among the component h positioned at the center of the inter-field pseudo median filter, horizontal and vertical components b, g, i and e, and diagonal components a, c, d and f is 4:2:1.

In operation of the inter-field pseudo median filter unit 11 associated with the equation (1), the one-line memory 101, the one-field memory 102 and the first to sixth sample memories 111 to 116 operate to sequentially delay the input image signal Vi, thereby generating pixel values a, b, c, d, e, f, h and i. Four-pixel values (a,b,g,h), (b,c,h,i), (g,h,d,e) and (h,i,e,f) selected from the above pixel values a to i are sequentially applied to respective first to fourth 4×1 Max filters 117 to 120 and respective first to fourth 4×1 Min filters 121 to 124. The Max filters 117 to 120 detect the Maximum ones from the received four-pixel values, respectively, whereas the Min filters 121 to 124 detect the minimum ones of the received four-pixel values, respectively. The Maximum pixel values detected by the Max filters 117 to 120 are applied to the fifth 4×1 Min filter 125 which, in turn, detects the minimum one of the outputs from the Max filters 117 to 120 and sends it to the adder 127. The minimum pixel values detected by the Min filters 121 to 124 are applied to the sixth 4×1 Max filter 126 which, in turn, detects the Maximum one of the outputs from the Min filters 121 to 124 and sends it to the adder 127.

The adder 127 sums the received values and sends the resultant value to the ½ amplifier 128 which, in turn, performs a ½ amplification of the received value, thereby generating a pixel value to be used in interpolation.

On the other hand, the intra-field pseudo median filter unit 12 generates median values S by use of scanning lines $P_1$ and $P_2$ in the current field and pixels in the current field and applies them to its filters so as to calculate a pixel value to be used in interpolation, as shown in FIG. 7.

Assuming that a position of a pixel to be interpolated corresponds to a position between b and c in the current field, the intra-field pseudo median filter unit 12 operates by use of the following processing equation:

$$PMED[A,B,C,D] = 0.5 \times \text{Min}\{\text{Max}(a,b,s), \quad (2)$$
$$\text{Max}(b,c,s), \text{Max}(d,e,s),$$
$$\text{Max}(e,f,s)\} + 0.5 \times$$
$$\text{Max}\{\text{Min}(a,b,s), \text{Min}(b,c,s),$$
$$\text{Min}(d,e,s), \text{Min}(e,f,s)\}.$$

In operation of the intra-field pseudo median filter unit 12 associated with the equation (2), the one-line memory 101 and the first to fourth sample memories 111 to 114 operate to sequentially delay the input image signal Vi, thereby generating pixel values a, b, c, d, e and f. These values are applied to the medium value generator 151 to generate a pixel value S applied to a central tap. Together with the pixel value S, the values a to f are selectively applied to the first to fourth 3×1 Max filters 152 to 155 and the first to fourth 3×1 Min filters 156 to 159. The Max filters 152 to 155 detect the Maximum ones from the received pixel values, respectively, whereas the Min filters 156 to 159 detect the minimum ones of the received pixel values, respectively. The Maximum pixel values detected by the Max filters 152 to 155 are applied to the 4×1 Min filter 160 which, in turn, detects the minimum one of the outputs from the Max filters 152 to 155 and sends it to the adder 162. The minimum pixel values detected by the Min filters 156 to 159 are applied to the 4×1 Max filter 161 which, in turn, detects the Maximum one of the outputs from the Min filters 156 to 159 and sends it to the adder 162.

The adder 162 sums the received values and sends the resultant value to the ½ amplifier 163 which, in turn, performs a ½ amplification of the received value, thereby generating a pixel value to be used in interpolation.

As shown in FIGS. 6 and 14A, the mixing unit 14 serves to select, as a pixel to be used in interpolation, the output from the intra-field pseudo median filter unit or the output from the inter-field pseudo median filter unit, according to the determination control signal MM from the inter-field/intra-field determination processing unit 10. Alternatively, the mixing unit 14 serves to select, as a pixel to be used in interpolation, a value obtained by adding the output of the inter-field pseudo median filter unit to the output of the intra-field pseudo median filter unit, according to the determination control signal MM from the inter-field/intra-field determination processing unit 10, as shown in FIGS. 6 and 14B.

A simplified form of the equation (1) is as follows:

$$PMED[A,B,C,D] = 0.5 \times \text{Min}\{\text{Max}(a,b,h), \quad (3)$$
$$\text{Max}(b,c,h), \text{Max}(h,d,e),$$
$$\text{Max}(h,e,f)\} + 0.5 \times$$
$$\text{Max}\{\text{Min}(a,b,h), \text{Min}(b,c,h),$$
$$\text{Min}(h,d,e), \text{Min}(h,e,f)\}.$$

In the equation (3), the use ratio among the central component h, the vertical components b and e, and the diagonal components a, c, d and f is 4:2:1, in similar to the equation (1).

Figure 11:
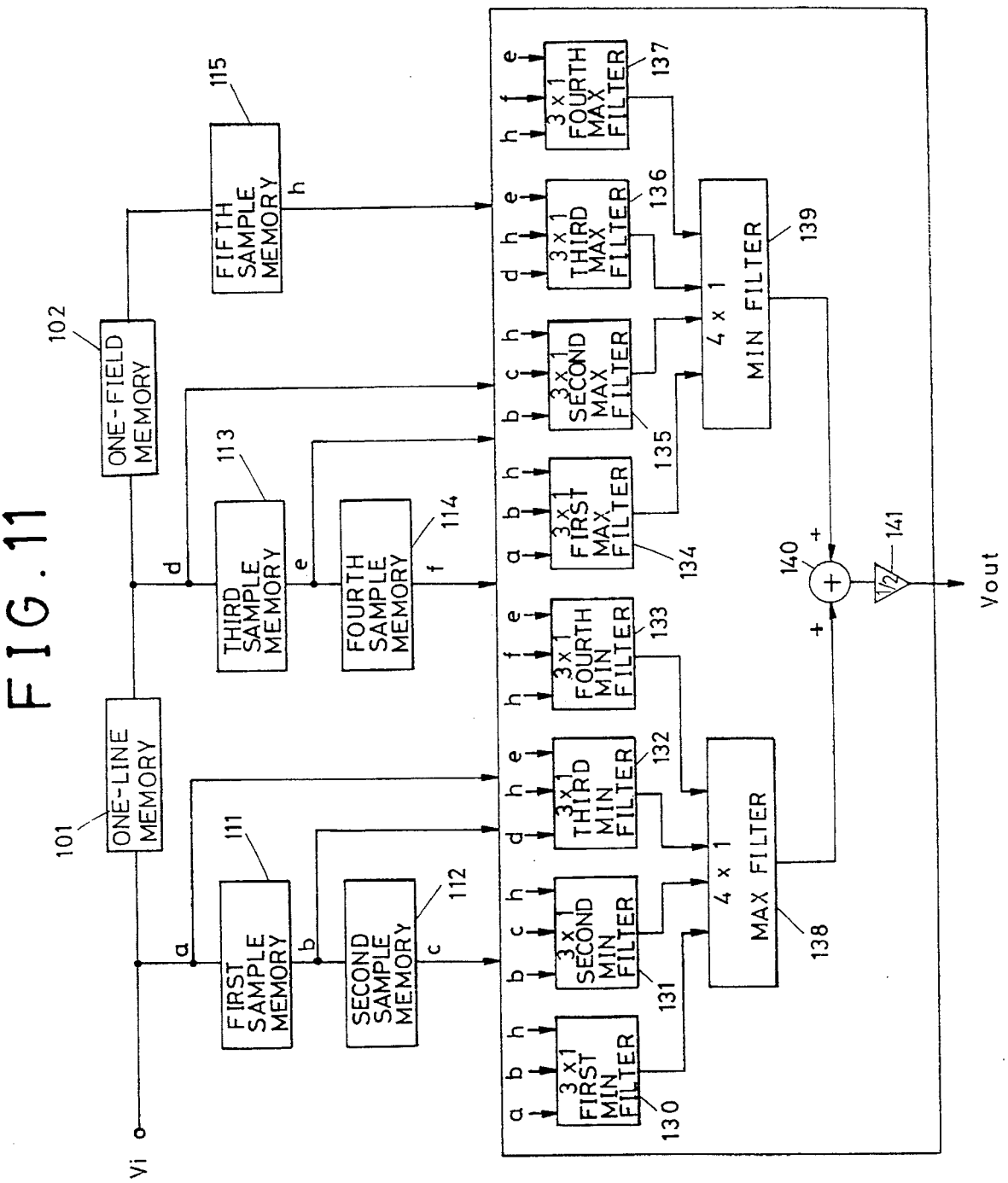

As shown in FIG. 11, the inter-field pseudo median filter unit 11 associated with the equation (3) includes the first and second sample memories 111 and 112 for sequentially delaying the input image signal Vi by one clock and thereby generating pixel values a, b and c, and the third and fourth sample memories 113 and 114 for sequentially delaying the output signal from the one-line memory 101 and thereby generating pixel values d, e and f. The one-line memory 101 which serves to delay the input image signal Vi by one line also constitutes a part of the inter-field pseudo median filter unit 11. The inter-field pseudo median filter unit 11 further includes the fifth sample memory 115 for delaying the output signal from the one-field memory 102 by one clock and thereby generating a pixel value h. The one-field memory 102 which serves to delay the output signal from the one-line memory 101 by one field also constitutes a part of the inter-field pseudo median filter unit 11. The inter-field pseudo median filter unit 11 further includes first to fourth 3×1 Min filters 130 to 133 for detecting minimum ones from three-pixel values (a,b,h), (b,c,h), (d,h,e), (h,f,e) received therein and outputting them, respectively, first to fourth 3×1 Max filters 134 to 137 for detecting Maximum ones from the three-pixel values and outputting them, respectively, a 4×1 Max filter 138 for detecting the Maximum one from output signals of the first to fourth 3×1 Min filters 130 to 133, a 4×1 Min filter 139 for detecting the minimum one from output signals of the first to fourth 3×1 Max filters 134 to 137, an adder 140 for adding an output signal from the 4×1 Min filter 139 to an output signal from the 4×1 Max filter 138, and a ½ amplifier 141 for ½ amplifying an output signal from the adder 140.

in operation of the inter-field pseudo median filter unit 11, the one-line memory 101, the one-field memory 102 and the first to fifth sample memories 111 to 115 operate to sequentially delay the input image signal Vi, thereby generating pixel values a, b, c, d, e, f, and h. Three-pixel values (a,b,h), (b,c,h), (d,h,e) and (h,f,e) selected from the above pixel values a, b, c, d, e, f and h are sequentially applied to respective first to fourth 3×1 Min filters 130 to 133 and respective first to fourth 3×1 Max filters 134 to 137. The Min filters 130 to 133 detect the minimum ones from the received three-pixel values, respectively, whereas the Max filters 1134 to 137 detect the Maximum ones of the received four-pixel values, respectively.

The minimum pixel values detected by the Min filters 130 to 133 are applied to the 4×1 Max filter 1138 which, in turn, detects the Maximum one of the outputs from the Min filters 130 to 133 and sends it to the adder 140. The Maximum pixel values detected by the Max filters 134 to 137 are applied to the 4×1 Min filter 139 which, in turn, detects the minimum one of the outputs from the Max filters 134 to 137 and sends it to the adder 140.

The adder 140 sums the received values and sends the resultant value to the ½ amplifier 1141 which, in turn, performs a ½ amplification of the received value, thereby generating a pixel value to be used in interpolation.

Where the median value s is not used in association with the equation (2), the intra-field pseudo median filter unit 12 operates by use of the following processing equation:

$$PMED[A,B,C,D] = 0.5 \times \text{Min}\{\text{Max}(a,b), \text{Max}(b,c), \text{Max}(d,e), \text{Max}(e,f)\} + 0.5 \times \text{Max}\{\text{Min}(a,b), \text{Min}(b,c), \text{Min}(d,e), \text{Min}(e,f)\}. \quad (4)$$

As shown in FIG. 13, the intra-field pseudo median filter unit 12 includes the first and second sample memories 111 and 112 for sequentially delaying the input image signal Vi by one clock and thereby generating pixel values a, b and c, the one-line memory 101 for delaying the input image signal Vi by one line, and the third and fourth sample memories 113 and 114 for sequentially delaying the output signal from the one-line memory 101 and thereby generating pixel values d, e and f. The intra-field pseudo median filter unit 12 further includes first to fourth 2×1 Max filters 171 to 174 for detecting Maximum ones from two-pixel values (a,b), (b,c), (d,e), (e,f) selected from the values a, b, c, d, e and f and outputting them, respectively, first to fourth 2×1 Min filters 175 to 178 for detecting minimum ones from the two-pixel values and outputting them, respectively, a 4×1 Min filter 179 for detecting the minimum one from output signals of the first to fourth 2×1 Max filters 171 to 174, a 4×1 Max filter 180 for detecting the Maximum one from output signals of the first to fourth 2×1 Min filters 175 to 178, an adder 181 for adding an output signal from the 4×1 Min filter 179 to an output signal from the 4×1 Max filter 180, and a ½ amplifier 182 for ½ amplifying an output signal from the adder 181.

In operation of the intra-field pseudo median filter unit 12 having the above-mentioned arrangement, the one-line memory 101 and the first to fourth sample memories 111 to 114 operate to sequentially delay the input image signal Vi, thereby generating pixel values a, b, c, d, e and f. Different two-pixel values selected from the pixel values a to f are applied to the first to fourth 2×1 Max filters 171 to 174 and the first to fourth 2×1 Min filters 175 to 178, respectively. The Max filters 171 to 174 detect the Maximum ones from the received pixel values, respectively, whereas the Min filters 175 to 178 detect the minimum ones of the received pixel values, respectively. The Maximum pixel values detected by the Max filters 171 to 174 are applied to the 4×1 Min filter 179 which, in turn, detects the minimum one of the outputs from the Max filters 171 to 174 and sends it to the adder 181. The minimum pixel values detected by the Min filters 175 to 178 are applied to the 4×1 Max filter 180 which, in turn, detects the Maximum one of the outputs from the Min filters 175 to 178 and sends it to the adder 181.

The adder 181 sums the received values and sends the resultant value to the ½ amplifier 182 which, in turn, performs a ½ amplification of the received value, thereby generating a pixel value to be used in interpolation.

In similar to the above-mentioned case, the mixing unit 14 serves to select, as a pixel to be used in interpolation, the output from the intra-field pseudo median filter unit or the output from the inter-field pseudo median filter unit, according to the determination control signal MM from the inter-field/intra-field determination processing unit 10, as shown in FIGS. 6 and 14A. Alternatively, the mixing unit 14 serves to select, as a pixel to be used in interpolation, a value obtained by adding the output of the inter-field pseudo median filter unit to the output of the intra-field pseudo median filter unit, according to the determination control signal MM from the inter-field/intra-field determination processing unit 10, as shown in FIGS. 6 and 14B.

This can be used for increasing scanning lines of luminance or color signals in improved definition TV or extended definition TV receivers.

As apparent from the above description, the present invention provides an interpolating component generator for a scanning line interpolator selectively using one of inter-field and inter-field pseudo median filter units, thereby capable of solving problems such as a step edge phenomenon and a reduced vertical resolution encountered in fixed intra-field or inter-field interpolation systems, an overlap phenomenon occurring in median filters, and an increase in cost and a failure to consider diagonal components in Faroudja's temporal median filter system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An interpolating component generator for a scanning line interpolator for an input image signal comprising:

an inter-field/intra-field determination unit for determining an intra-field variation and an inter-field variation from said input image signal and providing an output signal based on said inter-field variation and said intra-field variation;

an inter-field pseudo median filter unit for generating an inter-field pixel value to be used in interpolation by use of current field information and previous field information, of said input image signal, said inter-field pseudo median filter unit combining values for three or more pixels of said input image signal;

an intra-field pseudo median filter unit for generating an intra-field pixel value to be used in interpolation by use of current field information of the input image signal, said intra-field pseudo median filter unit combining values for three or more pixels of said input image signal; and a mixing unit for mixing the inter-field pixel value and said intra-field pixel value according to said output signal from said inter-field/intra-field determination unit and thereby outputting a pixel value to be finally used in interpolation,, wherein said mixing unit is adapted to select, as a pixel to be used in interpolation, a value obtained by summing output signals from said intra-field and inter-field pseudo median filter units, according to said output signal from said inter-field/intra-field determination unit.

2. An interpolating component generator for a scanning line interpolator using pseudo median filters comprising:

an inter-field/intra-field determination unit for determining an intra-field variation and an inter-field variation from an input image signal; wherein said inter-field/intra-field determination unit comprises:

an one-line memory for delaying said input image signal by one line;

an one-field memory for delaying an output signal from said one-line memory by one field;

a first adder for adding said output signal from the one-line memory to the input image signal;

a second adder for adding an output signal from said one-field memory to the output signal from the one-line memory;

a third adder for adding said output signal from the one-field memory to the input image signal;

first to third low pass filters for low-pass filtering output signals from the first to third adders, respectively;

first to third absolute value generators for receiving output signals from said first to third low pass filters and thereby generating absolute values, respectively;

a mixer for mixing output signals from said second and third absolute value generators; and a comparator for comparing an output signal from said first absolute value generator with an output signal from said mixer and thereby outputting the comparison result as a determination control signal;

an inter-field pseudo median filter unit for generating a pixel value to be used in interpolation by use of current field information and previous field information of said input image signal;

an intra-field pseudo median filter unit for generating a pixel value to be used in interpolation only by use of current field information of the input image signal; and a mixing unit for mixing output signals from said inter-field and intra-field pseudo median filter units according to output information from said inter-field/intra-field determination unit and thereby outputting a pixel value to be finally used in interpolation.

3. An interpolating component generator for a scanning line interpolator using pseudo median filters comprising:

an inter-field/intra-field determination unit for determining an intra-field variation and an inter-field variation from an input image signal;

an inter-field pseudo median filter unit for generating a pixel value to be used in interpolation by use of current field information and previous field information of said input image signal; and wherein said inter-field pseudo median filter unit comprises, first and second sample memories for sequentially delaying said input image signal by one clock and thereby generating pixel values (a, b and c);

a one-line memory for delaying the input image signal by one line;

third and fourth sample memories for sequentially delaying an output signal from said one-line memory and thereby generating pixel values (d, e and f);

a one-field memory for delaying said output signal from the one-line memory by one field;

fifth and sixth sample memories for sequentially delaying the output signal from the one-field memory by one clock and thereby generating pixel values (h and i);

first to fourth 4×1 Max filters for detecting Maximum ones from four-pixel values (a, b, g, h), (b, c, h, i), (g, h, d, e), (h, i, e, f) received therein and outputting them, respectively;

first to fourth 4×1 Min filters for detecting minimum ones from said four-pixel values and outputting them, respectively;

a fifth 4×1 Min filter for detecting the minimum one from output signals of said first to fourth 4×1 Max filters;

a fifth 4×1 Max filter for detecting the Maximum one from output signals of said first to fourth 4×1 Min filters;

an adder for adding an output signal from said fifth 4×1 Min filter to an output signal from said fifth 4×1 Max filter;

a ½ amplifier for ½ amplifying an output signal from said adder;

an intra-field pseudo median filter unit for generating a pixel value to be used in interpolation only by use of current field information of the input image signal; and a mixing unit for mixing output signals from said inter-field and intra-field pseudo median filter units according to output information from said inter-field/intra-field determination unit and thereby outputting a pixel value to be finally used in interpolation.

4. An interpolating component generator for a scanning line interpolator using pseudo median filters comprising:

an inter-field/intra-field determination unit for determining an intra-field variation and an inter-field variation from an input image signal;

an inter-field pseudo median filter unit for generating a pixel value to be used in interpolation by use of current field information and previous field information of said input image signal;

an intra-field pseudo median filter unit for generating a pixel value to be used in interpolation only by use of current field information of the input image signal; and wherein said intra-field pseudo median filter unit comprises:

first and second sample memories for sequentially delaying said input image signal by one clock and thereby generating pixel values (a, b and c); a one-line memory for delaying the input image signal by one line;

third and fourth sample memories for sequentially delaying an output signal from said one-line memory and thereby generating pixel values (d, e and f);

a one-field memory for delaying said output signal from the one-line memory by one field;

fifth sample memory for delaying said output signal from the one-field memory by one clock and thereby generating a pixel value (h);

first to fourth 3×1 Min filters for detecting minimum ones from three-pixel values (a,b,h), (b,c,h), (d,h,e), (h,f,e) received therein and outputting them, respectively;

first to fourth 3×1 Max filters for detecting Maximum ones from said three-pixel values and outputting them, respectively;

a 4×1 Max filter for detecting the Maximum one from output signals of said first to fourth 3×1 Min filters;

a 4×1 Min filter for detecting the minimum one from output signals of said first to fourth 3×1 Max filters;

an adder for adding an output signal from said 4×1 Min filter to an output signal from said 4×1 Max filter; and a ½ amplifier for ½ amplifying an output signal from the adder; a mixing unit for mixing output signals from said inter-field and intra-field pseudo median filter units according to output information from said inter-field/intra-field determination unit and thereby outputting a pixel value to be finally used in interpolation.

5. An interpolating component generator for a scanning line interpolator using pseudo median filters comprising:

an inter-field/intra-field determination unit for determining an intra-field variation and an inter-field variation from an input image signal;

an inter-field pseudo median filter unit for generating a pixel value to be used in interpolation by use of current field information and previous field information of said input image signal;

an intra-field pseudo median filter unit for generating a pixel value to be used in interpolation only by use of current field information of the input image signal; wherein said intra-field pseudo median filter unit comprises:

first and second sample memories for sequentially delaying said input image signal by one clock and thereby generating pixel values (a, b and c);

a one-line memory for delaying the input image signal by one line;

third and fourth sample memories for sequentially delaying an output signal from said one-line memory and thereby generating pixel values (d, e and f);

a median value generator for receiving said pixel values (a to f) generated from the one-line memory and the first to fourth sample memories and thereby calculating a median value (s);

first to fourth 3×1 Max filters for detecting Maximum ones from three-pixel values (a,b,s), (b,c,s), (d,e,s), (e,f,s) each including two pixel values and said median value, and outputting them, respectively;

first to fourth 3×1 Min filters for detecting minimum ones from said three-pixel values and outputting them, respectively;

a 4×1 Min filter for detecting the minimum one from output signals of said first to fourth 3×1 Max filters;

a 4×1 Max filter for detecting the Maximum one from output signals of said first to fourth 3×1 Min filters;

an adder for adding an output signal from said 4×1 Min filter to an output signal from said 4×1 Max filter;

a ½ amplifier for ½ amplifying an output signal from said adder; and a mixing unit for mixing output signals from said inter-field and intra-field pseudo median filter units according to output information from said inter-field/intra-field determination unit and thereby outputting a pixel value to be finally used in interpolation.

6. An interpolating component generator for a scanning line interpolator using pseudo median filters comprising:

an inter-field/intra-field determination unit for determining an intra-field variation and an inter-field variation from an input image signal;

an inter-field pseudo median filter unit for generating a pixel value to be used in interpolation by use of current field information and previous field information of said input image signal;

an intra-field pseudo median filter unit for generating a pixel value to be used in interpolation only by use of current field information of the input image signal; and wherein said intra-field pseudo median filter unit comprises:

first and second sample memories for sequentially delaying said input image signal by one clock and thereby generating pixel values (a, b and c);

a one-line memory for delaying the input image signal by one line;

third and fourth sample memories for sequentially delaying said output signal from the one-line memory and thereby generating pixel values (d, e and f);

first to fourth 2×1 Max filters for detecting Maximum ones from two-pixel values (a,b), (b,c), (d,e), (e,f) selected from said pixel values (a, b, c, d, e and f) received therein and outputting them, respectively;

first to fourth 2×1 Min filters for detecting minimum ones from said two-pixel values received therein and outputting them, respectively;

a 4×1 Min filter for detecting the minimum one from output signals of said first to fourth 2×1 Max filters;

a 4×1 Max filter for detecting the Maximum one from output signals of said first to fourth 2×1 Min filters;

an adder for adding an output signal from said 4×1 Min filter to an output signal from said 4×1 Max filter;

a ½ amplifier for ½ amplifying an output signal from said adder; and a mixing unit for mixing output signals from said inter-field and intra-field pseudo median filter units according to output information from said inter-field/intra-field determination unit and thereby outputting a pixel value to be finally used in interpolation.

\* \* \* \* \*